US008312131B2

(12) United States Patent
Vasudevan

(10) Patent No.: US 8,312,131 B2
(45) Date of Patent: Nov. 13, 2012

(54) METHOD AND APPARATUS FOR LINKING MULTIMEDIA CONTENT RENDERED VIA MULTIPLE DEVICES

(75) Inventor: Venugopal Vasudevan, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 2985 days.

(21) Appl. No.: 10/334,848

(22) Filed: Dec. 31, 2002

(65) Prior Publication Data

US 2004/0125123 A1 Jul. 1, 2004

(51) Int. Cl.
*G06F 15/173* (2006.01)
(52) U.S. Cl. ........ 709/224; 709/231; 709/232; 709/246; 715/716; 715/728
(58) Field of Classification Search ................. 709/246, 709/231, 232
See application file for complete search history.

(56) References Cited

U.S. PATENT DOCUMENTS

| | | | | |
|---|---|---|---|---|
| 5,737,495 A * | 4/1998 | Adams et al. | ............ | 707/104.1 |
| 5,802,299 A * | 9/1998 | Logan et al. | ................. | 709/218 |
| 6,233,736 B1 * | 5/2001 | Wolzien | ........................ | 725/110 |
| 6,243,756 B1 * | 6/2001 | Whitmire et al. | ............ | 709/232 |
| 6,314,466 B1 * | 11/2001 | Agarwal et al. | ............... | 709/231 |
| 6,633,918 B2 * | 10/2003 | Agarwal et al. | ............... | 709/231 |
| 6,665,659 B1 * | 12/2003 | Logan | .............................. | 707/3 |
| 6,769,032 B1 * | 7/2004 | Katiyar et al. | ................ | 709/246 |
| 6,871,236 B2 * | 3/2005 | Fishman et al. | ............. | 709/246 |
| 6,941,560 B1 * | 9/2005 | Lowry et al. | ................... | 719/328 |
| 6,993,559 B2 * | 1/2006 | Jilk et al. | ....................... | 709/206 |
| 7,032,003 B1 * | 4/2006 | Shi et al. | ........................ | 709/203 |
| 7,039,857 B2 * | 5/2006 | Beck et al. | ................. | 715/500.1 |
| 7,082,470 B1 * | 7/2006 | Lesser | ............................ | 709/232 |
| 7,222,088 B2 * | 5/2007 | Nishikado et al. | ............ | 705/26.1 |
| 7,284,065 B2 * | 10/2007 | Agarwal et al. | ............... | 709/231 |
| 7,404,186 B2 * | 7/2008 | Massarenti | ..................... | 719/311 |
| 7,627,652 B1 * | 12/2009 | Commons et al. | ............ | 709/219 |
| 7,685,252 B1 * | 3/2010 | Maes et al. | .................... | 709/217 |
| 7,752,335 B2 * | 7/2010 | Boxenhorn | ................... | 709/246 |
| 7,779,355 B1 * | 8/2010 | Erol et al. | ...................... | 715/273 |

(Continued)

OTHER PUBLICATIONS

Han et al., "WebSplitter: A unified XML Framework for Multi-Device Collaborative Web Browsing," ACM of CSCW, 2000, pp. 1-10.*

(Continued)

*Primary Examiner* — Backhean Tiv

(57) ABSTRACT

A method for delivering requested media content is provided. A requested media object requested by a user device is received, the requested media object including media of at least a first type. A first new media object is created, the first new media object having at least some of the media of the requested media object of the first type. A second new media object is created, the second new media object having at least some of the media of the requested media object of a second type, if any. At least one user interface mechanism is inserted into the second new media object, the at least one user interface mechanism corresponding to media of the requested media object of the first type included in the first new media object. The second new media object is delivered to the user device, and the first new media object is delivered to a secondary device separate from the user device. A first new media object indicator is caused to be generated in response to activation of the at least one user interface mechanism via the user device, the first new media object indicator indicating to a user media of the first new media object rendered on the secondary device.

30 Claims, 10 Drawing Sheets

U.S. PATENT DOCUMENTS

| | | | | |
|---|---|---|---|---|
| 7,860,825 | B2 * | 12/2010 | Chatterjee et al. | 707/610 |
| 7,899,935 | B2 * | 3/2011 | Zhu et al. | 709/246 |
| 8,046,838 | B1 * | 10/2011 | Karp et al. | 726/26 |
| 8,073,881 | B1 * | 12/2011 | Georgiev | 707/812 |
| 8,171,099 | B1 * | 5/2012 | Malmskog et al. | 709/213 |
| 8,200,837 | B1 * | 6/2012 | Bhatti et al. | 709/232 |
| 2001/0044805 | A1 * | 11/2001 | Multer et al. | 707/201 |
| 2002/0010746 | A1 * | 1/2002 | Jilk et al. | 709/206 |
| 2002/0029284 | A1 * | 3/2002 | Agarwal et al. | 709/231 |
| 2002/0095462 | A1 * | 7/2002 | Beck et al. | 709/204 |
| 2003/0023755 | A1 | 1/2003 | Harris et al. | |
| 2003/0135411 | A1 * | 7/2003 | Ushiki et al. | 705/14 |
| 2004/0239699 | A1 * | 12/2004 | Uyttendaele et al. | 345/716 |
| 2005/0114774 | A1 * | 5/2005 | Berryman | 715/700 |
| 2005/0188310 | A1 * | 8/2005 | Dideriksen et al. | 715/728 |
| 2006/0064500 | A1 * | 3/2006 | Roth et al. | 709/231 |
| 2006/0075141 | A1 * | 4/2006 | Boxenhorn | 709/246 |
| 2006/0218304 | A1 * | 9/2006 | Mukherjee et al. | 709/246 |
| 2007/0005795 | A1 * | 1/2007 | Gonzalez | 709/232 |
| 2007/0244991 | A1 * | 10/2007 | Dowling | 709/218 |
| 2008/0215746 | A1 * | 9/2008 | Agarwal et al. | 709/231 |
| 2008/0299999 | A1 * | 12/2008 | Lockhart et al. | 455/466 |
| 2009/0327891 | A1 * | 12/2009 | Holm et al. | 715/716 |
| 2010/0223393 | A1 * | 9/2010 | Silverbrook et al. | 709/231 |
| 2010/0235543 | A1 * | 9/2010 | Gmuender et al. | 709/246 |
| 2011/0282995 | A1 * | 11/2011 | Gass et al. | 709/226 |
| 2012/0072608 | A1 * | 3/2012 | Peters et al. | 709/231 |
| 2012/0089915 | A1 * | 4/2012 | Flinn et al. | 715/728 |

OTHER PUBLICATIONS

R. Han et al., "WebSplitter. a Unified XML Framework for Multi-Device Collaborative Web Browsing," ACM Conference on Computer Supported Cooperative Work (CSCW)(2000), available at http://www.cs.colorado.edu/~rhan/CSC1_7143_002_Fall_2001/Papers/Han2000_WebSplitter.pdf.

J. Herstad et al., "Tailor to Fit It," available at http://iris22.it.jyu/iris22/pub/Herstad_R260-final.pdf.

H. Wang et al., "ICEBERG: An Internet-core Network Architecture for Integrated Communications," IEEE Personal Communications (2000): Special Issue on IP-based Mobile Networks, available at http://iceberg.cs.berkeley.edu/publications.html.

M. Hori, "Annotation of Web Content for Transcoding," Dagstuhl Seminar: Semantics for WWW, (Mar. 2000) available at http://www.semanticweb.org/events/dagstuhl2000/mhori.pdf.

M. Hori, "Annotation-Based Web Content Transcoding," WWW9 Workshop: Multimedia on the Web, (May 2000) available at http://www.cwi.nl~lynda/www9/www9-ws-hori.pdf.

M. Roman et al., "Gala: A Middleware Infrastructure to Enable Active Spaces, Revised Paper #20 (2nd Revision)," (Jul. 1, 2002) available at http://choices.cs.uiuc.edu/gaia/papers/GaiaSubmitted3.pdf.

R. Karrer et al., "Location Selection for Active Services," available at http://www-ece.rice.edu/~karrer/papers/hpdc01.pdf (Dec. 19, 2002).

S. Shafer et-al, "Easy Living," Microsoft Corporation (2001), available at http://research.microsoft.com/easyliving.

S. Shafer, "What is Ubiquitous Computing?" Microsoft Corporation (2000), available at http://research.microsoft.com/easyliving.

R. Han et al., "Dynamic Adaptation in an Image Transcoding Proxy for Mobile Web Browsing," IEEE Personal Communications Magazine, Dec. 1998, pp. 8-17.

R. Mohan et al., "Adapting Multimedia Internet Content for Universal Access," IEEE Transactions on Multimedia, Mar. 1999, pp. 104-114.

C.-S. Li et al., "Multimedia Content Description in the InfoPyramid," IEEE Proc. Int. Conf. Acoust., Speech, Signal Processing (ICASSP), Seattle, WA, Special session on Signal Processing in Modem Multimedia Standards, May 1998.

J. Smith et al., "Content-based Transcoding of Images in the Internet," Proceedings of the International Conference on Image Processing (ICIP), 1998.

R. Smith et al., "Transcoding Internet Content for Heterogeneous Client Devices," Proc. IEEE Inter. Symp. on Circuits, Syst. (ISCAS). Special session on Next Generation Internet, Jun. 1998.

"Transcoding Technical Papers and Presentations," IBM Research, http://www.research.ibm.com/networked_data_systems/transcoding/Publications/publications.html, printed on Feb. 20, 2003.

A. Haneef, "An Adaptive Multimedia Content Delivery Middleware for Mobile Multi-Device Neighborhoods," Thesis, Univ. of Mass. Amherst, Dept. of Elec. and Comp. Eng. (Sep. 2002).

J. Mysore et al., "A Reconfiguration Stream Orchestration Framework for Mobile Users," Presented at the Third International Conference on Mobile Data Management (MDM 2002), Singapore, Jan. 8-11, 2002.

B. Johanson et al., "Multibrowsing: Moving Web Content Across Multiple Displays," Proceedings of Ubicomp 2001, Atlanta, Sep. 2001 available at http://graphics.stanford/edu/papers/mb_ubicomp01.

S. Marti, "Active Messenger: Email Filtering and Mobile Delivery," Thesis, MIT, School of Architecture and Planning, available at http://web.media.mit.edu/~stefanm/thesis/am.html.

E. Skow et al., "A Security Architecture for Application Session Handoff," International Conference on Communications (ICC 2002), Apr. 28-May 2, 2002, available at http://pcl.cs.ucla.edu/projects/imash/docs.htm.

"Pervasive Computing Laboratory: iMASH Documentation," http://pcl.cs.ucla.edu/projects/imash/docs.htm, printed on Feb. 20, 2003.

J. Rekimoto, "A Multiple Device Approach for Supporting Whiteboard-based Interactions," ACM Conference on Human Factors in Computing Systems (CHI '98), Los Angeles, Apr. 1998, available at http://www.csl.sony.co.jp/person/rekimoto/papers/chi98.pdf.

N. Steitz et al., "i-LAND: An Interactive Landscape for Creativity and Innovation," ACM Conference on Human Factors in Computing Systems (CHI '99), Pittsburgh, May 1999, available at http://www.ipsi.fhg.de/ambiente/paper/chi99Reprint.pdf.

A. Fox, "Stanford Interactive Workspaces," Jun. 4, 2002, available at http://snrc.stanford.edu/events/workshop/0602/fox.pdf.

International Search Report dated Feb. 8, 2005 re PCT/US03/41320.

* cited by examiner

244 — PICTURE A — 282

TextA textA textA textA textA textA textA textA textA textA textA textA textA textA textA textA textA textA textA textA textA textA textA textA textA textA textA textA textA textA textA textA textA textA textA textA textA textA textA textA textA textA textA textA textA textA textA textA textA textA textA textA textA textA textA

248 — PICTURE B — 284

TextB textB textB textB textB textB textB textB textB textB

252 — PICTURE C — 286

TextC textC textC textC textC textC textC textC textC textC

280

*FIG. 7*

METHOD AND APPARATUS FOR LINKING MULTIMEDIA CONTENT RENDERED VIA MULTIPLE DEVICES

CROSS REFERENCE TO RELATED APPLICATIONS

The present disclosure is related to commonly owned U.S. patent application Ser. No. 10/334,291, entitled "System and Method For Rendering Content on Multiple Devices," filed on Dec. 31, 2002, which is herein incorporated by reference in its entirety for all purposes.

TECHNICAL FIELD

The present disclosure generally relates to rendering multimedia content, and more particularly to rendering multimedia content via multiple devices.

BACKGROUND

Some mobile computing devices with limited display capabilities are also provided with web browsing capability. For example, a personal digital assistant (PDA) may include a wireless modem and web browsing software. As another example, a cellular phone may include a display and web browsing software. But because of typical limitations of these devices (e.g., power, memory, display resolution, screen size), they may not be capable of adequately rendering content on the internet that is intended for full-sized computers (e.g., desktop computers, laptop computers, etc.). For example, a display of a PDA or cell phone may be incapable of displaying anything other than text or simple icons because of its display resolution and screen size. Alternatively, the rendering of content by the device may be of too poor quality to be useful. For instance, a picture from a web page that is displayed on a mobile device may be unintelligible because of the display's low resolution, and/or small screen size.

Similarly, mobile computing devices typically are not capable of adequately rendering audio or video streams that may be available to it. For example, a PDA may not include an audio system, or its audio system may be capable of generating only lower quality audio. Such a PDA may not be capable of adequately rendering, for example, an MP3 music file available on the internet.

In general, content available via the Internet may not be able to be rendered as intended on many mobile computing devices.

BRIEF DESCRIPTION OF THE DRAWINGS

FIG. 7 is an illustration of an example of a new media object based on the example media object of FIG. 5.

DETAILED DESCRIPTION

Terms

As used herein, the term "multimedia content" refers to content that includes one or more of any type of electronic media. Examples of types of electronic media are text, icons, graphics, video, audio, etc. Types of electronic media may also be user defined. For example, tags of a web page may define different types (e.g., title, picture, button, etc.). Additionally, a type of media content may include a combination of other types of media content. For instance, a type of media content may include text and graphics that can be displayed on a low resolution display device, such as icons, buttons, etc. Multimedia content may comprise one or more objects, such as a file, a web page, a data stream, etc.

System Overview

Figure 1:
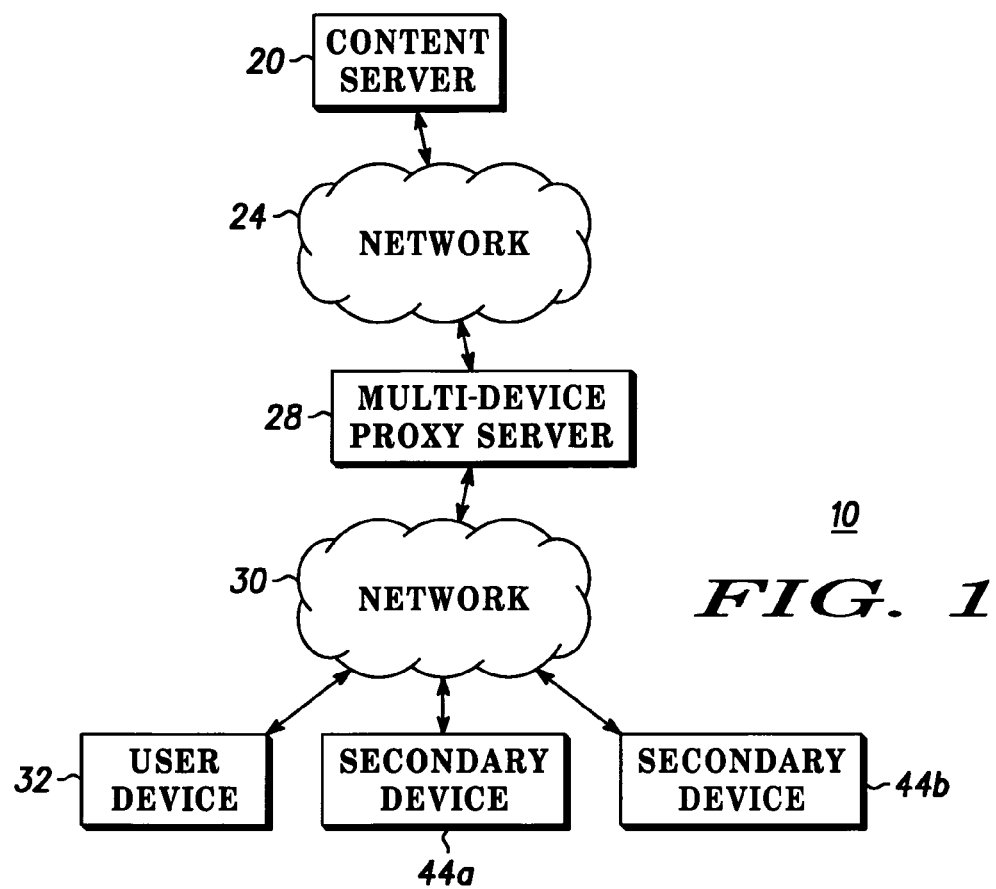
FIG. 1 is a block diagram of an example environment in which content may be delivered to multiple devices for rendering on the multiple devices.

FIG. 1 is a block diagram of an example environment 10 in which content may be delivered to multiple devices for rendering on the multiple devices. A content server 20 may be coupled to a network 24. The content server 20 may provide content to users via the network 24. The content may include, for example, web pages, streaming video, streaming audio, etc. A single content server 20 may provide multiple types of content (e.g., web pages, video, audio), or different content servers may provide different types of content (e.g., the environment 100 may include a web page server, a video server, and/or an audio server). The network 24 may comprise a wide area network (WAN), an internet, the Internet, an intranet, an extranet, a local area network (LAN), etc.

A multi-device proxy server 28 may also be coupled to the network 24 and to a network 30. A user device 32 and secondary devices 44 may be coupled with the network 30. The multi-device proxy server 28 will be described in more detail below. In general, the multi-device proxy server 28 may act as a gateway between the devices 32 and 44 and the content server 20. For example, if information is to be transmitted from a device coupled to the network 24, such as the content server 20, to the user device 32, such information should pass through the multi-device proxy server 28. The network 30 may comprise a local area network, an internet, an intranet, an extranet, a local area network, etc.

The user device 32 may comprise a device, such as a cellular phone, a personal digital assistant (PDA), a two-way pager, etc. In examples described below, the user device 32 may not be capable of adequately presenting to a user one or more types of media content. For example, the user device 32 may not include an audio device. Also, the user device 32 may not include a display device, or its display device may not be capable of adequately displaying certain types of visual media. For example, the user device 32 may include a monochrome display device, and/or its display device may have low spatial resolution. It should be understood, however, that the user device may also be capable of adequately rendering the different types of data. For example, the user device 32 may be a desk top computer, lap top computer, a set top box coupled to a television, etc.

The user device 32 may include capability for requesting multimedia content from a content server, such as content server 20, via the network 24. For example, the user device 32 may include web browsing software.

The secondary device 44a may be a device that includes a display device such as a television, a monitor, etc. The secondary device 44b may be a device that includes an audio device such as a pair of headphones, one or more speakers, etc. The secondary devices 44 may be combined into a single device such as a television.

Figure 2:
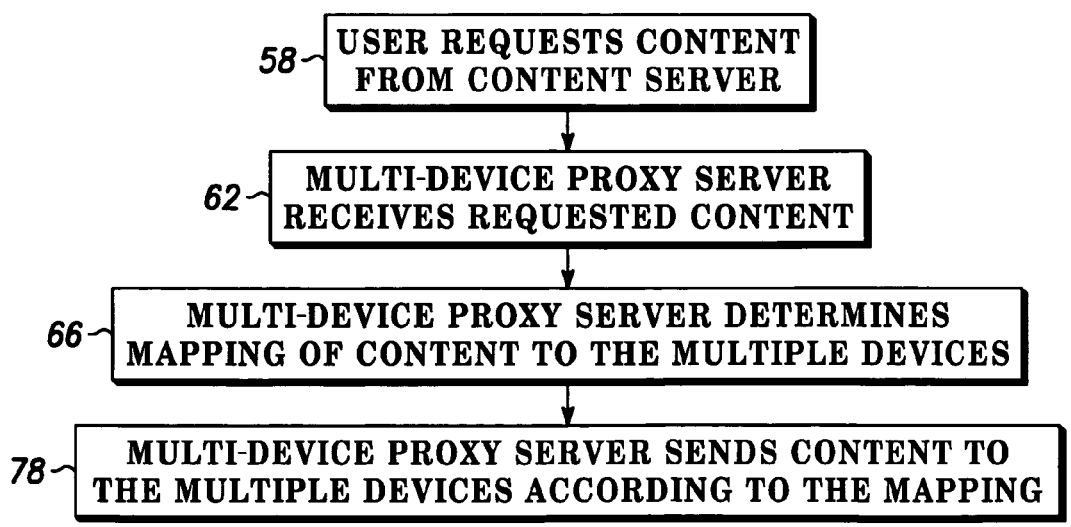
FIG. 2 is a flow diagram of an example method for delivering content to multiple devices.

FIG. 2 is a flow diagram of an example method 50 for delivering content to multiple devices, and will be described with reference to FIG. 1.

At block 58, the user may request content from the content server 20. For example, the user may request content using the user device 32.

At block 62, content from the content server 20 that was requested by the user device 32 may be received by the multi-device proxy server 28. At block 66, the multi-device proxy server 28 may determine a mapping of the requested content to the devices to which the user has access. For example, the mapping may indicate text and graphics should go to user device 32 while audio should go to device 44a or 44b.

At block 78, the multi-device proxy server 28 may deliver the content, or a portion of the content, to the multiple devices according to the mapping determined at block 66.

Another example environment in which content may be delivered to multiple devices for rendering on the multiple devices is described in U.S. patent application Ser. No. 10/334,291, entitled "System and Method For Rendering Content on Multiple Devices."

Presenting Multimedia Content on Multiple Devices

Figure 3:
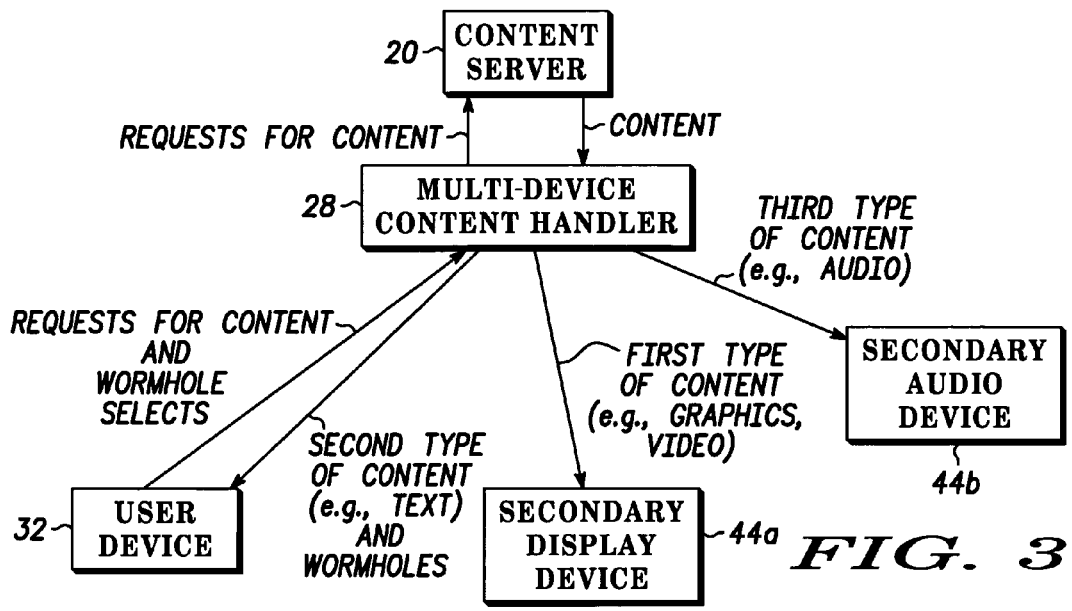
FIG. 3 is a diagram illustrating an example of data flow in the environment of FIG. 1.

FIG. 3 is a diagram illustrating an example of data flow in the environment 10 of FIG. 1. The user device 32 may request content from the content server 20. Such requests may be routed through the multi-device proxy server 28. The multi-device proxy server 28 may reformat the request so that the content server 20 sends the requested content to the multi-device proxy server 28. In response to the request, the content server 20 may send the requested content to the multi-device proxy server 28.

Then, the multi-device proxy server 28 may parse the requested content based on the type of content. For example, if the user device 32 is only capable of displaying text and simple (i.e., low-resolution) graphics, and cannot adequately present audio data, the multi-device proxy server 28 may parse the requested content into three types of content: 1) a first type of content that includes graphics (other than simple graphics that the user device 32 can display) and video; 2) a second type of content that includes text and simple graphics; and 3) a third type of content that includes audio data.

The multi-device proxy server 28 may then deliver some or all of the second type of content to the user device 32. Prior to delivering this content to the user device 32, the multi-device proxy server 28 may include in the content user interfaces mechanisms referred to herein as "wormholes." As will be described in greater detail below, the wormholes may be employed by a user of the user device 32, for example, to initiate the presentation of the first and third types of content via the secondary devices 44 and/or to logically link the first and third types of content rendered by the secondary devices 44 with the second type of content rendered by the user device 32.

For instance, the multi-device proxy server 28 may receive wormhole select messages from the user device 32. In response to a wormhole select message, the multi-device proxy server 28 may, for example, cause a graphics object from the requested media content to be rendered on a secondary device 44a that may include, for example, a desktop computer-type display. Similarly, in response to a wormhole select, the multi-device proxy server 28 may, for example, cause an audio object from the requested media content to be rendered via a secondary device 44b that may include an audio device.

Figure 4:
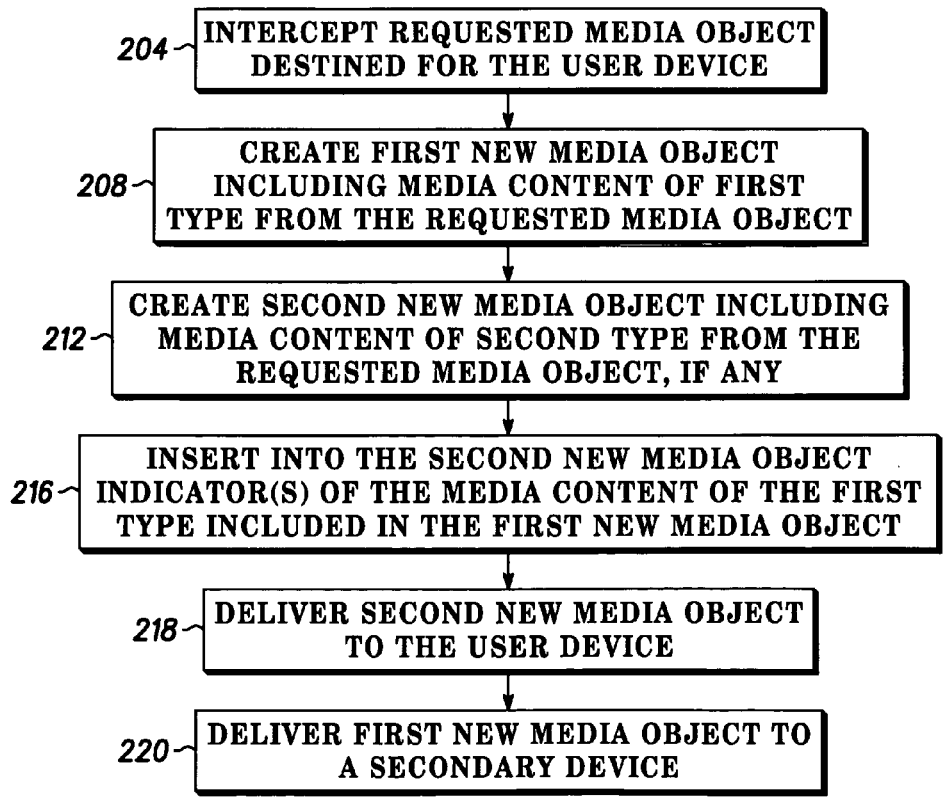
FIG. 4 is a flow diagram of an example method for rendering multimedia content on multiple devices.

FIG. 4 is a flow diagram of an example method for rendering multimedia content on multiple devices. The flow of FIG. 4 may be implemented in whole or in part via software executed by a processor. The software may be stored on a tangible medium such as a CD-ROM, a floppy disk, a hard drive, a digital versatile disk (DVD), or a memory associated with the processor. Persons of ordinary skill in the art will readily appreciate that the entire method or parts thereof could alternatively be executed by a device other than a processor, and/or embodied in firmware and/or dedicated hardware in a well known manner. Further, persons of ordinary skill in the art will readily appreciate that many other methods may alternatively be used. For example, the order of execution of the blocks may be changed, and/or the blocks may be changed, eliminated, or combined.

For ease of explanation, the flow of FIG. 4 will be described with reference to the example illustrated in FIG. 3, and also example web pages illustrated in FIGS. 5-7. At block 204, a media object requested by the user device 32 is received. Referring to FIG. 3, a media object destined for the user device 32 may be received by the multi-device proxy server 28.

Figure 5:
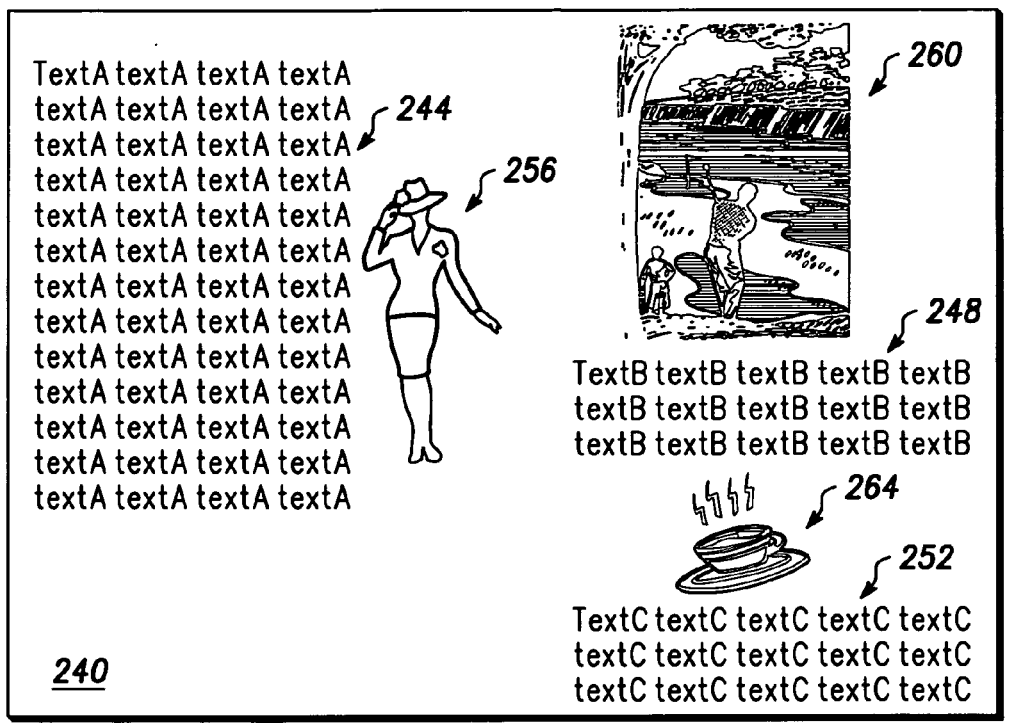
FIG. 5 is an illustration of an example media object.

Referring now to FIG. 5, an example media object is illustrated. In particular FIG. 5 illustrates a web page 240 including text objects 244, 248, and 252, and graphics objects 256, 260, and 264. The graphics object 256 may be associated with the text object 244, and the graphics object 260 may be associated with the text object 248. Also, the graphics object 264 may be associated with the text object 252. The text objects 244, 248, and 252 may be considered of one type of media content, and the graphics objects 256, 260, and 264 may be considered of another type. For instance, the text objects 244, 248, and 252 may be of a type of media content that the user device 32 is able to display on its display 40, and the graphics objects 256, 260, and 264 may be of a type that cannot be adequately displayed on the user display 40.

Referring again to FIG. 4, at block 208, a first new media object may be created that includes media content from the requested media object that is of a first type. For example, the multi-device proxy server 28 may create the first new media object. If the requested media object is the web page 240, the multi-device proxy server 28 may create a first new media object that may include one or more of the graphics objects 256, 260, and 264.

Figure 6:
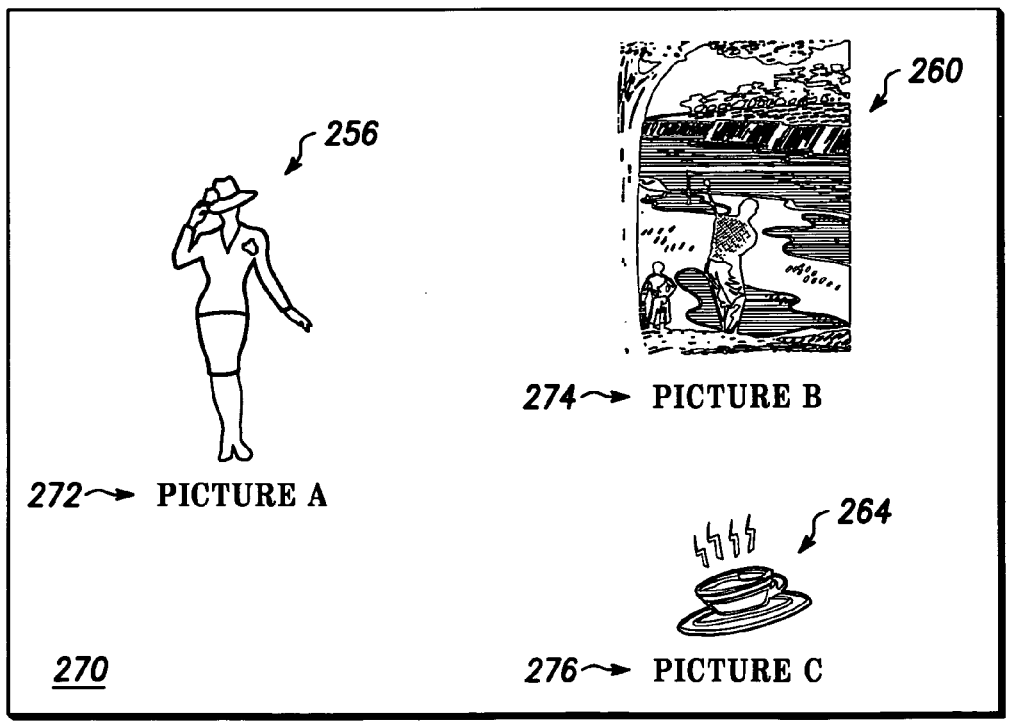
FIG. 6 is an illustration of an example of a new media object based on the example media object of FIG. 5.

Referring now to FIG. 6, an example of a first new media object is illustrated. In particular, multi-device proxy server 28 may create a web page 270 as illustrated. The web page 270 may include the graphics objects 256, 260, and 264 from the requested web page 240. In this example, the graphics objects 256, 260, and 264 are arranged in roughly the same layout as they were on the requested web page 240, but without the text. The web page 270 may also include object indicators (e.g., labels, captions, icons, etc.) 272, 274, and 276 proximate to each of the graphics objects 256, 260, and 264. These indicators may include, for example, a file name of the graphics object, an image tag (e.g., an HTML "ALT" attribute), etc.

Referring again to FIG. 4, at block 212, a second new media object may be created that includes media content from the requested media object that is of a second type. For example, the multi-device proxy server 28 may create the second new media object. If the requested media object is the web page 240, the multi-device proxy server 28 may create a second new media object that may include one or more of the text objects 244, 248, and 252. If the requested media object does not include any media content of the second type, an empty second new media object may be created.

Referring now to FIG. 7, an example of a second new media object is illustrated. In particular, multi-device proxy server 28 may create a web page 280 as illustrated. The web page 280 may include the text objects 244, 248, and 252 from the requested web page 240. In this example, the text objects 244, 248, and 252 are arranged in a different layout as compared to their layout on the requested web page 240. In other examples, the text objects 244, 248, and 252 may be arranged in roughly the same layout as they were on the requested web page 240, but without the graphics objects.

Referring again to FIG. 4, at block 216, indicators of the media content of the first type from the requested media object that are included in the first new media object are inserted into the second new media object. For example, the multi-device proxy server 28 may insert these indicators into the second new media object. Referring now to FIG. 7, the web page 280 may include indicators 282, 284, and 286 that indicate objects from the requested web page 240 are not present. In this example, the web page 280 includes three indicators 282, 284, and 286 that indicate that three objects from the requested web page 270 are not in the web page 280.

The indicators 282, 284, and 286 may include text that indicates what objects are not present. The indicator may include, for example, text that describes the type of object (e.g., graphic, picture, animation, video, etc.). Also, the indicator may include, for example, a file name of the object, an image tag (e.g., an HTML "ALT" attribute), etc. The indicators 282, 284, and 286 may comprise simple graphics (e.g., icons) that indicates what objects are not present. For example, a removed picture may be indicated by an icon that symbolizes a picture; a removed animation may be indicated by an icon that symbolizes an animation, etc. Further, persons of ordinary skill in the art will readily appreciate that many other mechanisms for indicating objects not present may alternatively be used. For example, an indicator may include a textual summary of salient features of a picture with which it is associated. This textual summary may be generated, for example, by pattern recognition software implemented by the multi-device proxy server 28 (FIG. 1). As will be described in further detail below, the indicators may also provide user interface mechanisms referred to herein as "wormholes."

Referring again to FIG. 4, at block 218, the second new media object may be delivered to the user device 32. For example, the multi-device proxy server 28 may deliver the second new media object to the user device 28. At block 220, the first new media object may be delivered to a secondary device. For example, the multi-device proxy server 28 may deliver the second new media object to the secondary display device 44 or the secondary audio device 52. The first new media object may be delivered when the second new media object is delivered to the user device 28. Alternatively, as will be described below, the first new media object may be delivered in response to a request from the user device 28.

Presenting a Web Page on Multiple Devices

Figure 8:
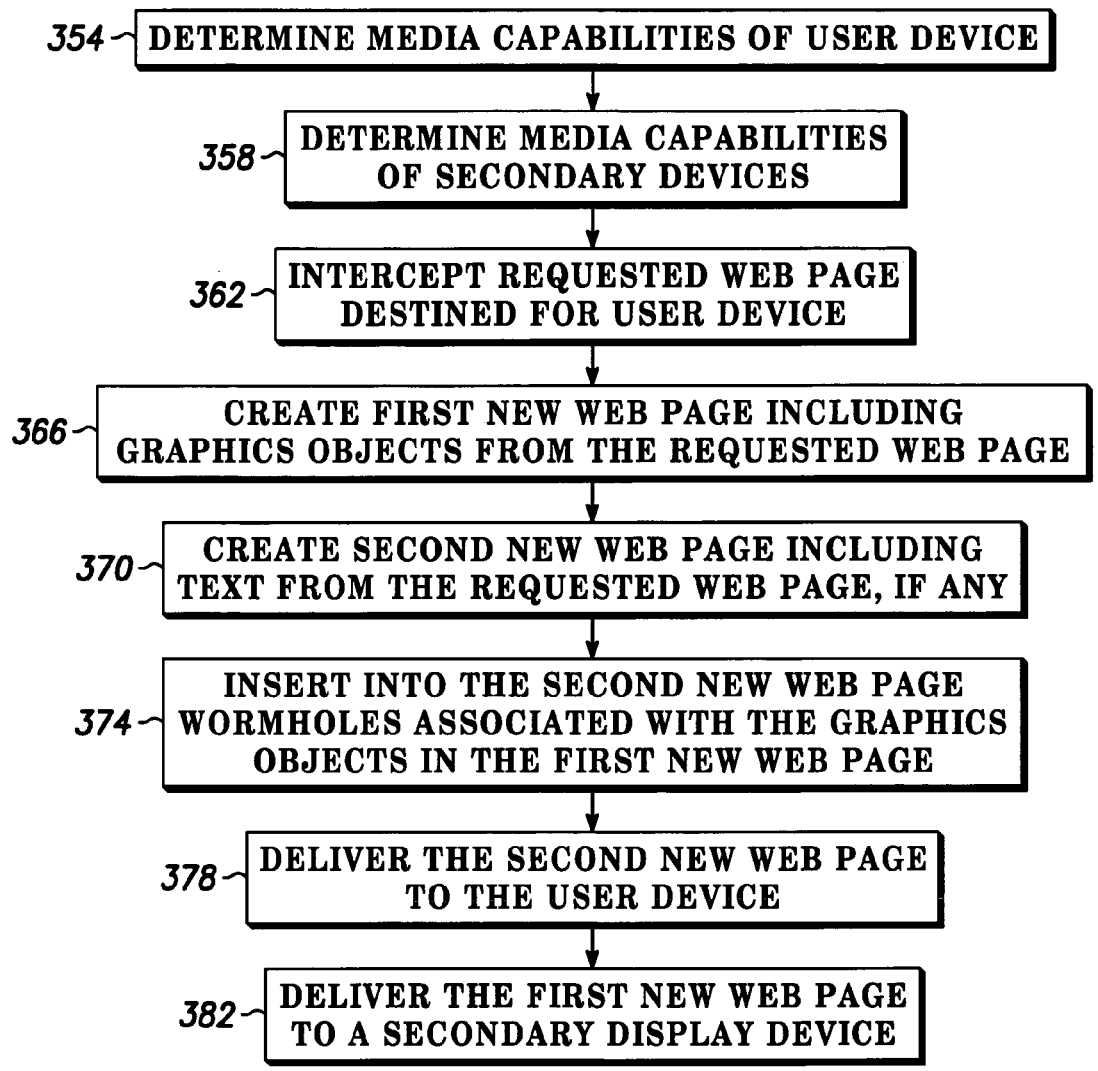
FIG. 8 is a flow diagram of an example method for rendering a web page, having media content of multiple types, on multiple devices.

An example in which the multimedia content is a web page will now be described. FIG. 8 is a flow diagram of an example method 350 for rendering a web page, having media content of multiple types, on multiple devices. The flow of FIG. 8 may be implemented in whole or in part via software executed by a processor. The software may be stored on a tangible medium such as a CD-ROM, a floppy disk, a hard drive, a digital versatile disk (DVD), or a memory associated with the processor. Persons of ordinary skill in the art will readily appreciate that the entire method or parts thereof could alternatively be executed by a device other than a processor, and/or embodied in firmware and/or dedicated hardware in a well known manner. Further, persons of ordinary skill in the art will readily appreciate that many other methods may alternatively be used. For example, the order of execution of the blocks may be changed, and/or the blocks may be changed, eliminated, or combined.

FIG. 8 will be described with reference to FIGS. 3 and 5-7. At block 354, the multi-device proxy server 28 may determine media presentation capabilities of the user device 32. The multi-device proxy server 28 may use this information, for example, to determine what media content of a web page requested by the user device should not be included in the web page actually delivered to the user device 32. Similarly, the multi-device proxy server 28 may use this information, for example, to determine what media content of a web page requested by the user device should be presented on one or more secondary devices 44. The multi-device proxy server 28 may determine this information by prompting the user to provide this information, for example, using web pages delivered to the user device 32. Additionally, the user may provide this information during a registration process with an entity that provides the service. Then, the multi-device proxy server 28 may determine the media presentation capabilities of the user device 32 based on, for example, a user ID provided by the user.

Also, the multi-device proxy server 28 may determine this information without user intervention. For example, the multi-device proxy server 28 and the user device 32 may automatically exchange information that permits the multi-device proxy server 28 to determine the media presentation capabilities of the user device 32. For example, a network or communication protocol according to which the multi-device proxy server 28 and the user device 32 are communicatively linked may provide for such an exchange. The user device 32 may provide explicit information regarding its media presentation capabilities. Additionally, the multi-device proxy server 28 may determine the media presentation capabilities of the user device 32 based on the type of device, its manufacturer, its model, etc.

Block 354 is optional and may be omitted. For example, it may be assumed that the user device 32 has a given media content presentation capability, and the actual media presentation capability of the user device 32 may be the same or different than that assumed.

At block 358, the multi-device proxy server 28 may determine media presentation capabilities of secondary devices 44. This may include determining what secondary devices 44 are available. Determining the media presentation capabilities of secondary devices may be accomplished in a manner similar to block 354. Additionally, this block is optional and may be omitted.

Various example methods that may be used by a multi-device proxy server 28 to determine what devices are available to a user, the device capabilities, etc. are described in U.S. patent application Ser. No. 10/334,291, entitled "System and Method For Rendering Content on Multiple Devices."

At block 362, a web page that was requested by the user device 32 is received by the multi-device proxy server 28. At block 366, the multi-device proxy server 28 creates a first new web page that includes graphic objects from the requested web page. For example, if the requested web page was web page 240 of FIG. 5, the multi-device proxy server 28 may create a web page 270 (FIG. 6) that includes the graphic objects 256, 260, and 264 from the requested web page 240. It is to be understood, however, that graphics objects from the requested web page 240 need not be included in a single new web page. For example, graphics objects may be included in multiple web pages. In one specific example, a single graphics object may be included in a single web page. The first new web page may also include object indicators associated with the graphics objects. For example, the web page 270 includes object indicators (e.g., labels, captions, icons, etc.) 272, 274, and 276 proximate to each of the graphics objects 256, 260, and 264.

At block 370, the multi-device proxy server 28 creates a second new web page that includes text objects from the requested web page. For example, if the requested web page was web page 240 of FIG. 5, the multi-device proxy server 28 may create a web page 280 (FIG. 7) that includes the text objects 244, 248, and 252 from the requested web page 240.

At block 374, the multi-device proxy server 28 may insert wormholes in the second new web page. The wormholes may be associated with the graphics objects in the first new web page. The web page 280 (FIG. 7), for example, may include wormholes 282, 284, and 286. The wormhole 282 may be associated with the graphics object 256 (FIG. 6). The wormhole 284 may be associated with the graphics object 260. The wormholes 282, 284, and 286 are user interface mechanisms that may assist the user in associating the media content presented on a secondary device with the web page presented on the user device 32.

At block 378, the multi-device proxy server 28 delivers the second new web page to the user device 32. At block 382, the multi-device proxy server 28 delivers the first new web page to a secondary device. Blocks 378 and 382 may be implemented in any order, and may be implemented substantially concurrently. Additionally, as will be describe below, block 382 may be implemented upon the user selecting a wormhole.

Figure 9:
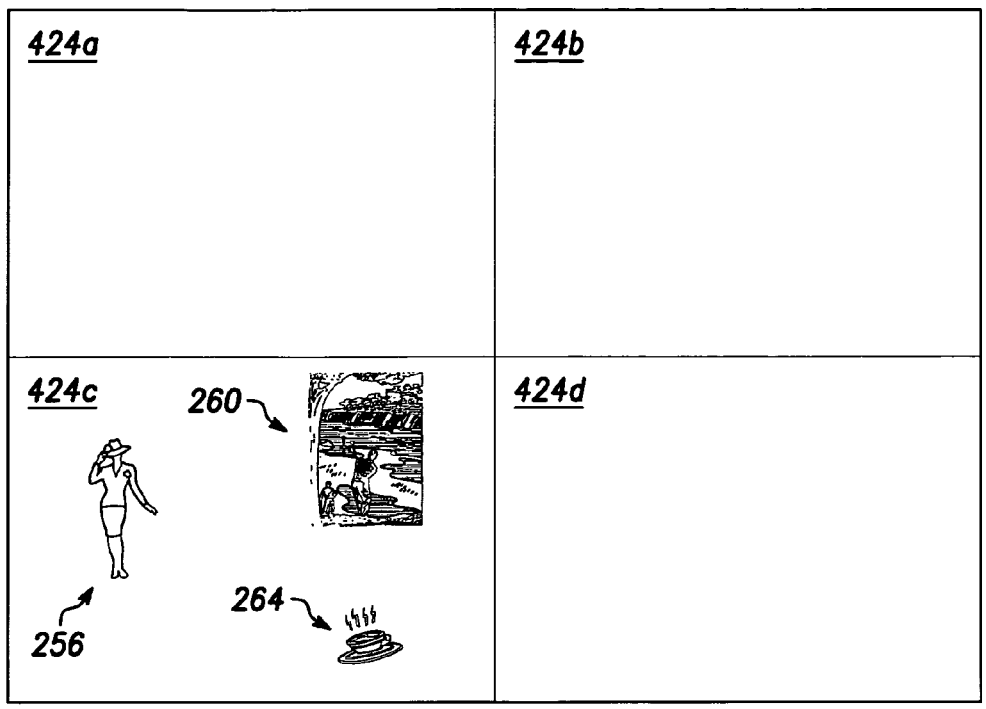
FIGS. 9 and 10 are illustrations of examples in which a web page may be delivered to a secondary device configured to implement a shared display.
Figure 10:
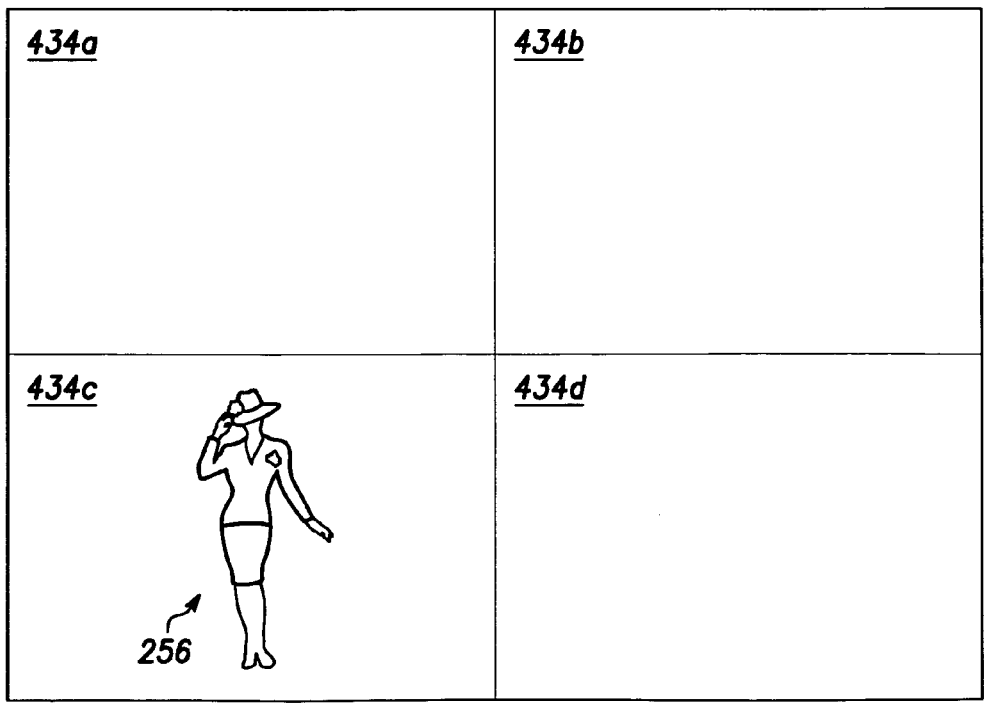

FIGS. 9 and 10 illustrate examples in which the first new web page may be delivered to a secondary device 44 configured to implement a shared display. FIG. 9 illustrates an example a shared display 420 partitioned into a plurality of display regions 424a, 424b, 424c, and 424d. Each region may be associated with a user. For example, region 424c may be associated with the user of user device 32. Although four display regions are illustrated, the display 420 may be partitioned into more or less regions. Additionally, the number of regions may change over time, for example, as the number of users using the shared display 420 changes over time. Moreover, the sizes of the display regions may be of the same size, different sizes, and the sizes may change over time.

In the example of FIG. 9, the region 424c displays a web page that includes the objects 256, 260, and 264 from the requested web page 240 (FIG. 5). FIG. 10 illustrates another example a shared display 430 partitioned into a plurality of display regions 434a, 434b, 434c, and 434d, where each region may be associated with a user. In this example, region 434c may be associated with the user of user device 32. The region 434c displays a web page that includes the object 256 from the requested web page 240 (FIG. 5). In this example, the user may select wormhole 284 of web page 280 (FIG. 7), using the user device 32, to display graphics object 260 (FIG. 5) in the display region 434c. Similarly, the user may select wormhole 286 of web page 280 (FIG. 7), using the user device 32, to display graphics object 264 (FIG. 5) in the display region 434c.

Using Wormholes

Figure 11:
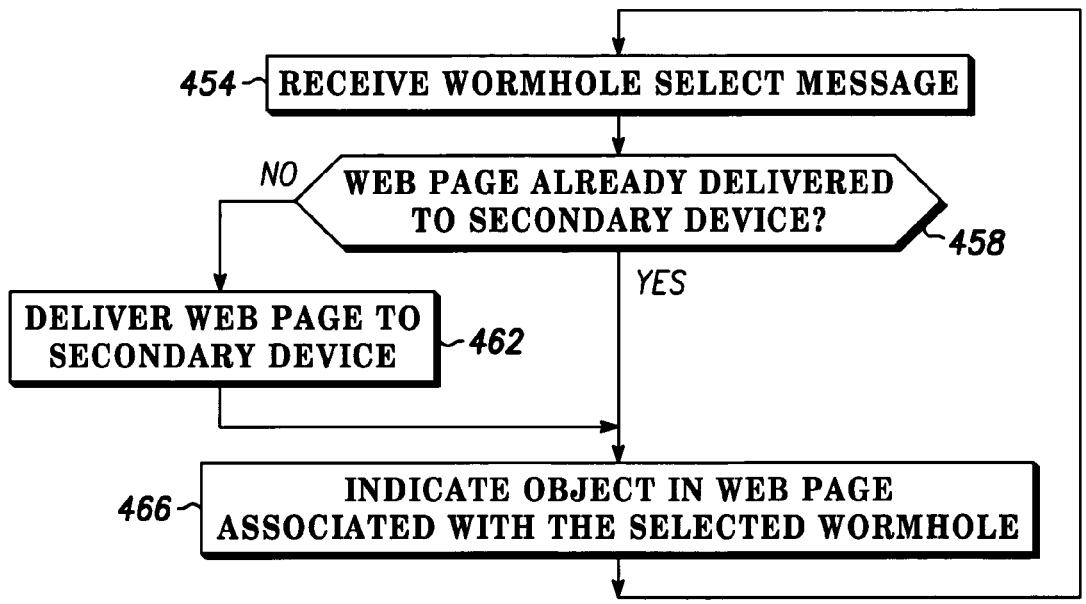
FIG. 11 is a flow diagram of an example method for indicating media objects presented on a secondary device in response to a wormhole select.

FIG. 11 is a flow diagram of an example method 450 for indicating media objects presented on a secondary device in response to a wormhole select. The flow of FIG. 11 may be implemented in whole or in part via software executed by a processor. The software may be stored on a tangible medium such as a CD-ROM, a floppy disk, a hard drive, a digital versatile disk (DVD), or a memory associated with the processor. Persons of ordinary skill in the art will readily appreciate that the entire method or parts thereof could alternatively be executed by a device other than a processor, and/or embodied in firmware and/or dedicated hardware in a well known manner. Further, persons of ordinary skill in the art will readily appreciate that many other methods may alternatively be used. For example, the order of execution of the blocks may be changed, and/or the blocks may be changed, eliminated, or combined.

The flow of FIG. 11 will be described with reference to FIGS. 6, 7, 9, and 10. At block 454, the multi-device proxy server 28 may receive a wormhole select message from the user device 32. For example, the user may select the wormhole 282 of web page 280 (FIG. 7). The user device 32 may then transmit to the multi-device proxy server 28 a message indicating that the wormhole 282 was selected.

At block 458, the multi-device proxy server 28 may determine whether the web page associated with the selected wormhole was already delivered to a secondary device. If no, at block 462, the multi-device proxy server 28 may deliver the associated web page to the secondary device. For example, the multi-device proxy server 28 may deliver the web page 270 (FIG. 6), the web page of section 424c (FIG. 9), or the web page of section 434c (FIG. 10). Then the flow may proceed to block 466.

If at block 458, it is determined that the associated web page was already delivered to a secondary device, then, at block 466, the multi-device proxy server 28 may cause the object associated with the selected wormhole to be indicated to the user. For instance, with reference to the web page 270 of FIG. 6, the multi-device proxy server 28 may cause the graphics object 256 to flash. Similarly, the multi-device proxy server 28 may cause the indicator 272 to flash. Similarly, with reference to FIGS. 9 and 10, the multi-device proxy server 28 may cause the object 256 to flash. The object or indicator may be caused to flash a predetermined number of times or for a predetermined amount of time. For example, the multi-device proxy server 28 may transmit data that causes the object or indicator to flash, or may transmit data that instructs the device 44 on which the object is being displayed to cause the object or indicator, etc. to flash.

One of ordinary skill in the art will recognize many other techniques for indicating the object to the user. In general, any visual, auditory, tactile, etc., mechanism that directs a user's attention to a device or media rendering may be used. The mechanism may also alert the user that a wormhole has been traversed, which may be helpful for users not yet familiar with the wormhole concept. Examples of other indicators that may be used include: 1) displaying an animated character over, or proximate to, the object being displayed on the secondary device; 2) superimposing a tone, a series of beeps, an audio message, etc., in an audio rendering; and 3) generating an audio message that can be heard by the user instructing the user to direct his or her attention to the appropriate secondary device (e.g., "You have traversed a wormhole from your wireless device. The picture associated with this wormhole is being displayed on the shared display at the front of the room.").

After block 466, the flow may revert back to block 454 to await a next wormhole select message.

Blocks 458 and 462 may be omitted, for example, if the web page that includes the graphics objects is automatically delivered to the secondary display device 44 when the associated web page that includes the text objects is delivered to the user device 32.

Streaming Media

Figure 12:
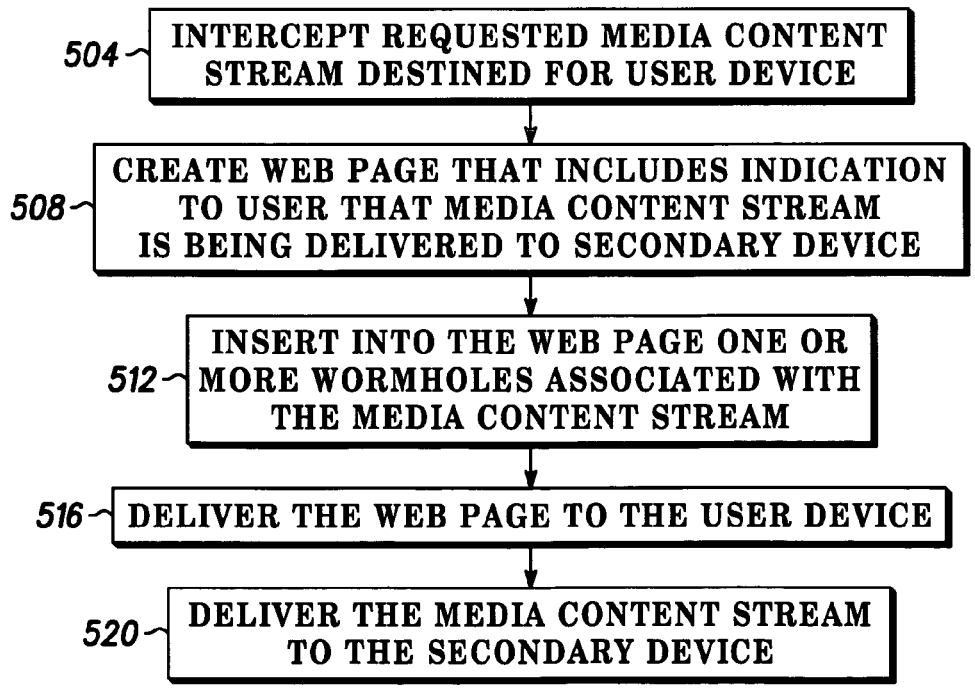
FIG. 12 is a flow diagram of an example method for delivering streaming media content to a secondary device 44.

FIG. 12 is a flow diagram of an example method for delivering streaming media content to a secondary device 44. The flow of FIG. 12 may be implemented in whole or in part via software executed by a processor. The software may be stored on a tangible medium such as a CD-ROM, a floppy disk, a hard drive, a digital versatile disk (DVD), or a memory associated with the processor. Persons of ordinary skill in the art will readily appreciate that the entire method or parts thereof could alternatively be executed by a device other than a processor, and/or embodied in firmware and/or dedicated hardware in a well known manner. Further, persons of ordinary skill in the art will readily appreciate that many other methods may alternatively be used. For example, the order of execution of the blocks may be changed, and/or the blocks may be changed, eliminated, or combined.

Figure 13:
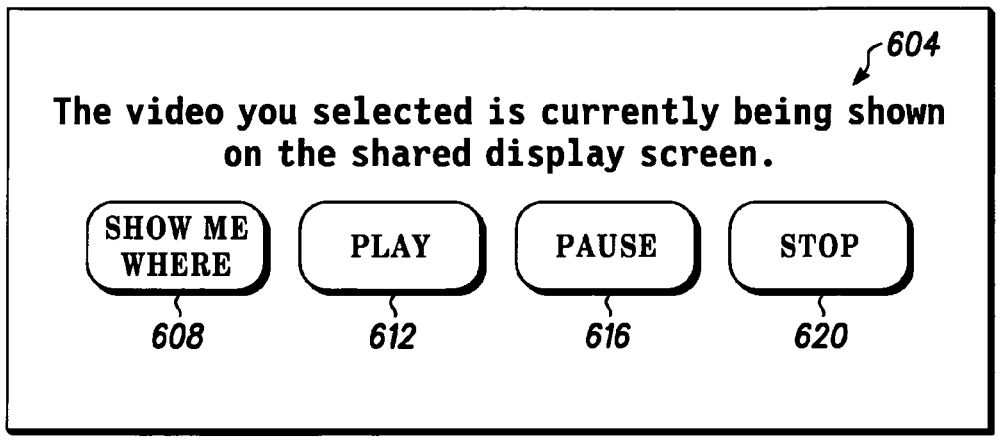
FIG. 13 is an illustration of an example web page.

The flow of FIG. 12 will be described with reference to FIG. 13. At block 504, the multi-device proxy server 28 may receive a media content stream requested by the user device 32. At block 508, the multi-device proxy server 28 may create a web page that includes an indication that the requested media content stream is being delivered to a secondary device. FIG. 13 is an illustration of an example web page 600. The web page 600 may include text 604 that indicates to the user that a video stream that the user requested is being delivered to a secondary device.

At block 512, the multi-device proxy server 28 may insert into the web page created at block 508 one or more wormholes associated with the media content stream. For example, the multi-device proxy server 28 may insert wormholes for one or more of: indicating to the user the requested media content stream, starting presentation of the content stream, stopping presentation of the content stream, pausing presentation of the content stream, etc. The web page 600 of FIG. 13 may include a plurality of wormholes 608, 612, 616, and 620. For instance, in response to the selection of wormhole 608, the multi-device proxy server 28 may cause the media content stream presented on a secondary device to be indicated to the user. For example, if the media content stream is being (or is to be) presented on a secondary display device, a text message may be displayed on the secondary display device indicating to the user that the media content stream will be presented there.

In response to the selection of wormhole 612, the multi-device proxy server 28 may cause the media content stream to begin being presented (if it was not already) on a secondary device. In response to the selection of wormhole 616, the multi-device proxy server 28 may cause the media content stream to be paused (if it was not already). In response to the selection of wormhole 620, the multi-device proxy server 28 may cause the media content stream to stop (if it was not already).

At block 516, the multi-device proxy server 28 may deliver the web page created at blocks 508 and 512 to the user device. At block 520, the multi-device proxy server 28 may cause the media content stream to be delivered to the secondary device. The media content stream may begin being delivered to the secondary device automatically, or in response to a wormhole select by the user using the user device 32.

Figure 14:
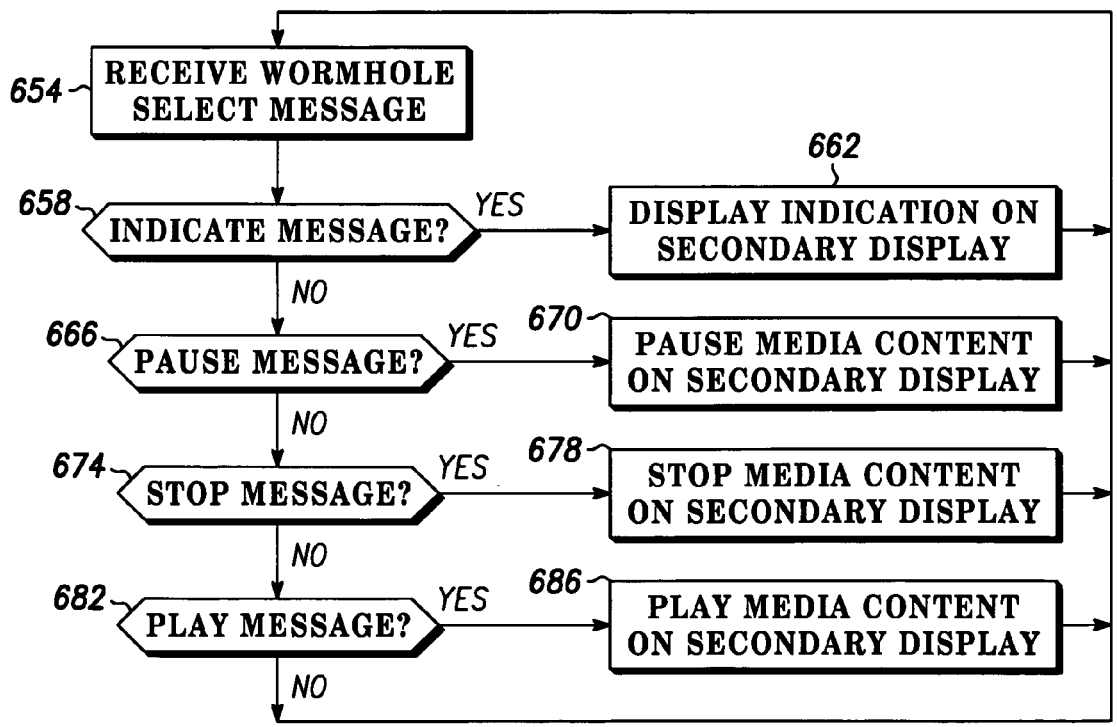
FIG. 14 is a flow diagram of an example method for rendering a media content stream using multiple devices.

FIG. 14 is a flow diagram of an example method 650 for rendering a media content stream using multiple devices. The flow of FIG. 14 may be implemented in whole or in part via software executed by a processor. The software may be stored on a tangible medium such as a CD-ROM, a floppy disk, a hard drive, a digital versatile disk (DVD), or a memory associated with the processor. Persons of ordinary skill in the art will readily appreciate that the entire method or parts thereof could alternatively be executed by a device other than a processor, and/or embodied in firmware and/or dedicated hardware in a well known manner. Further, persons of ordinary skill in the art will readily appreciate that many other methods may alternatively be used. For example, the order of execution of the blocks may be changed, and/or the blocks may be changed, eliminated, or combined.

At block 654, the multi-device proxy server 28 may receive a wormhole select message from the user device 32. At block 658, it may be determined whether the wormhole select message is a request to indicate to the user the media content stream. If yes, at block 662, the multi-device proxy server 28 may cause the media content stream presented on a secondary device to be indicated to the user. For example, if the media content stream is being (or is to be) presented on a secondary display device, a text message may be displayed on the secondary display device indicating to the user that the media content stream will be presented there. Then, the flow may proceed back to block 654 to await another wormhole select message.

At block 666, it may be determined whether the wormhole select message is a request to pause the media content stream. If yes, at block 670, the multi-device proxy server 28 may cause the media content stream to be paused (if it was not already). At block 674, it may be determined whether the wormhole select message is a request to stop the media content stream. If yes, at block 678, the multi-device proxy server 28 may cause the media content stream to stop (if it was not already). At block 682, it may be determined whether the wormhole select message is a request to play the media content stream. If yes, at block 686, the multi-device proxy server 28 may cause the media content stream to begin being presented (if it was not already) on a secondary device.

Multi-Device Proxy Server

The multi-device proxy server 28 may be implemented by, for example, a personal computer, a workstation, a server, a mainframe, a set-top box, a cellular base station, etc.

Figure 15:
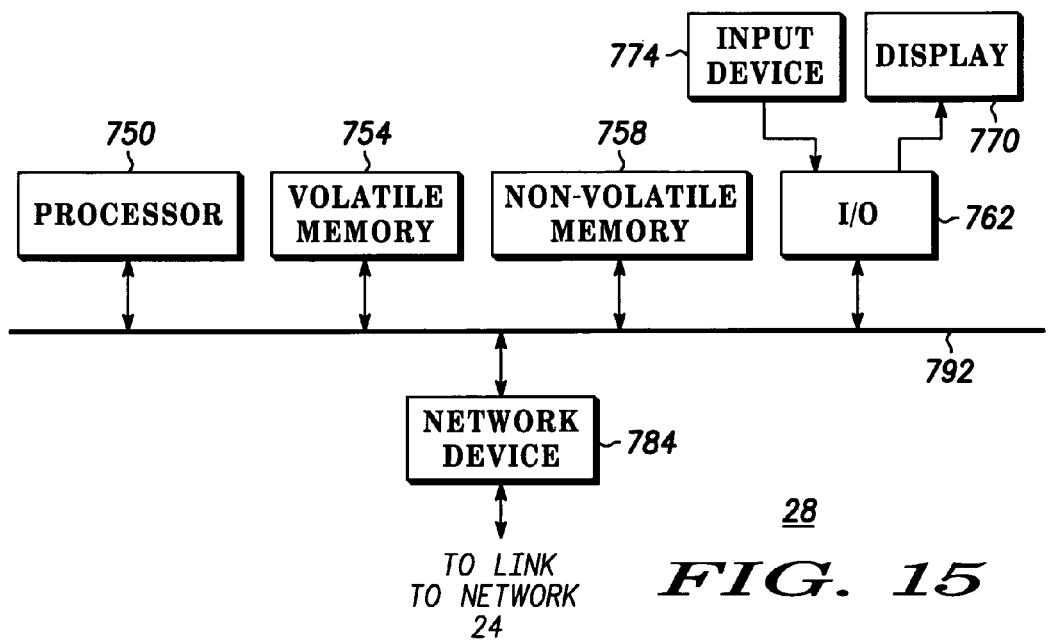
FIG. 15 is a block diagram of components of an example of a multi-device proxy server.

FIG. 15 is a block diagram of components of an example of a multi-device proxy server 28. The multi-device proxy server 28 may comprise at, least one: processor 750, a volatile memory 754, and a non-volatile memory 758. The volatile memory may include, for example, a random access memory (RAM). The non-volatile memory may include or more of, for example, a floppy disk, a hard disk, a read only memory (ROM), a compact disk ROM (CD-ROM), a digital versatile disk (DVD), a FLASH memory, etc. The multi-device proxy server 28 may also include an input/output device 762, and one or more displays 770 and input devices 774. Example of input devices 774 may include a keyboard, a keypad, a mouse, etc. The display 770 and the input device 774 may be coupled with the I/O device 762. The multi-device proxy server 28 may also include a network device 784 to couple the multi-device proxy server 28 to the network 24. The processor 750, the volatile memory 754, the non-volatile memory 758, the I/O device 762, and the network device 784 may be interconnected via an address/data bus 792.

Figure 16:
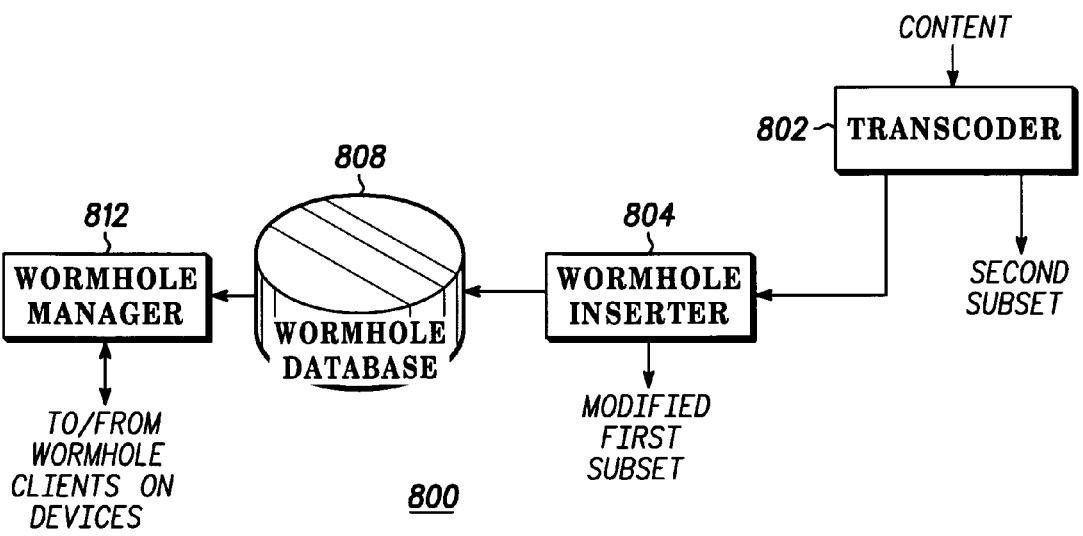
FIG. 16 is a block diagram of an example subsystem of a multi-device proxy server that inserts wormholes that assist a user with interpreting and navigating content being rendered on multiple devices.

FIG. 16 is a block diagram of an example subsystem 800 of a multi-device proxy server 28 that inserts wormholes that assist a user with interpreting and navigating content being rendered on multiple devices. For ease of explanation, the subsystem 800 will be described in the context of web pages.

The subsystem 800 may be, in whole or in part, a component of the multi-device proxy server 28, or may be implemented as one or more separate systems. In general, the subsystem 800 may receive content that has been requested by a user, and then modifies and partitions the content to include user interface mechanisms (wormholes) and so that it can be rendered on multiple devices. Additionally, the subsystem 800 may receive indications that a wormhole was activated, and may instruct a wormhole client on a secondary device 44 to respond to the activation. For example, a user may be viewing a web page rendered such that text and wormholes appear on a PDA and images appear on a desk top computer. When a user activates a wormhole via the PDA, the wormhole subsystem 800 may instruct the desk top computer displaying an image associated with the wormhole to cause the image to blink.

The wormhole subsystem may include a transcoder 802, a wormhole inserter 804, a wormhole database 808, and a wormhole manager 812. The transcoder 802 may transcode the content requested by the user into, for example, subsets of the content for rendering on multiple devices. As a particular example, the transcoder 802 may transcode the content to generate a first subset to be rendered on the user device 32 and a second subset to be rendered on a secondary device 44.

The wormhole inserter 804 may receive a first subset of the requested content, and may generate a modified first subset of the content that includes wormholes.

Figure 17:
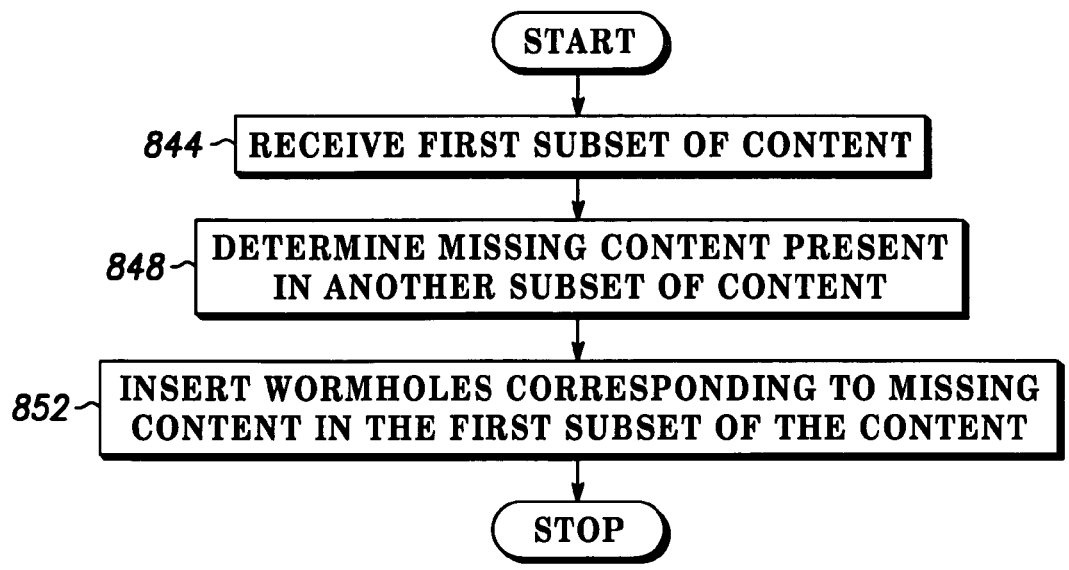
FIG. 17 is a flow diagram of an example method that may be implemented by the wormhole inserter of FIG. 16.

FIG. 17 is a flow diagram of an example method that may be implemented by the wormhole inserter 804. The method 840 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 840 or parts thereof could alternatively be executed by a device: other than a processor, and/or embodied in firmware and/or dedicated hardware in a well known manner. Further, although the example method is described with reference to the flow diagram in FIG. 17, persons of ordinary skill in the art will readily appreciate that many other methods may alternatively be used. For example, the order of execution of the blocks may be changed, and/or the blocks may be changed, eliminated, or combined.

At block 844, a first subset of the requested content may be received. For example, a web page requested by the user may have been partitioned into content types (e.g., text, graphics, etc.). The first subset of content may correspond to a first transcoded web page that includes text of the requested web page, but not many of the graphics. A second subset of the content may correspond to a second transcoded web page that includes the graphics missing from the first transcoded web page.

At block 848, some or all of the originally requested content that is missing from the first subset may be determined. For example, the graphics missing from the first web page may be determined. For instance, the transcoder 802 may provide this information to the wormhole inserter 804.

At block 852, wormholes corresponding to the missing content may be inserted in the first subset of content. The wormholes may include an indication of the content to which they correspond. Additionally, the wormholes may include an indication of the rendering device on which the missing content is being rendered, or should be rendered. These indications may be included in the wormholes themselves, or may be stored in the wormhole database 808.

For example, wormholes corresponding to the graphics missing from the first web page and included in the second web page may be inserted in the first web page. The wormholes may include indications of the content in the second web page to which they correspond, and the device on which the second web page is being rendered.

The wormhole inserter 804 may also store information relating to the inserted wormholes in the wormhole database 808. For example, the wormhole information may include an indication of the missing content to which it relates, on which device the missing content is being rendered, or should be rendered, etc. As an alternative, some or all of this information may be encoded in the wormhole itself.

When a user activates a wormhole on the user device 32 (e.g., by selecting, clicking on, etc. the wormhole), the user device 32 may transmit an indication of the wormhole selection to the multi-device proxy server 28. The indication may include information that would enable the subsystem 800 to determine the selected wormhole in the wormhole database 808. As an alternative, the indication may include information to enable the subsystem 800 to determine the missing content to which the selected wormhole relates, and the secondary device 44 on which the missing content is being rendered, or should be rendered.

Figure 18:
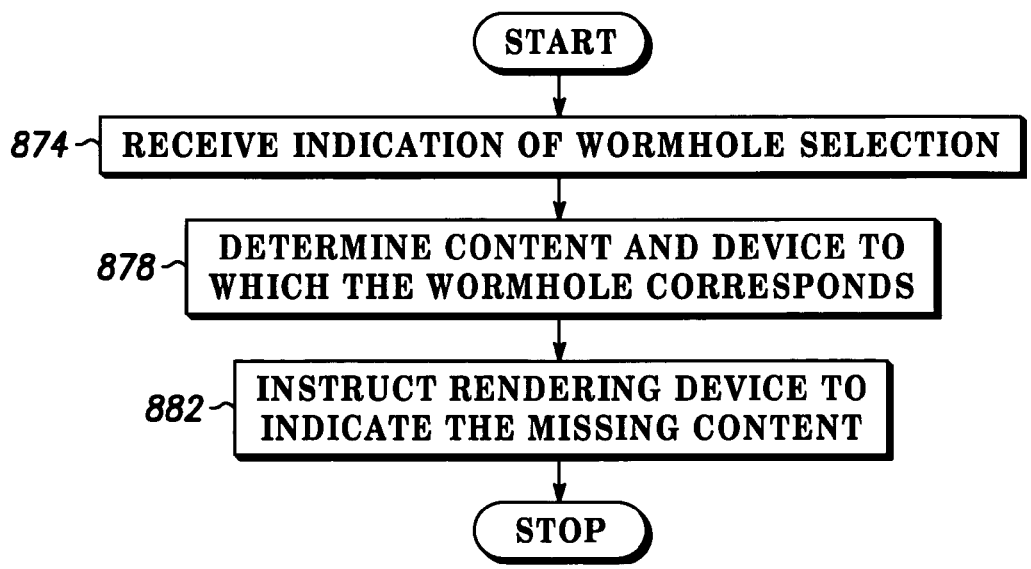
FIG. 18 is a flow diagram of an example method that may be implemented by the wormhole manager of FIG. 16.

FIG. 18 is a flow diagram of an example method that may be implemented by the wormhole manager 812. The method 870 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 870 or parts thereof could alternatively be executed by a device other than a processor, and/or embodied in firmware and/or dedicated hardware in a well known manner. Further, although the example method is described with reference to the flow diagram in FIG. 18, persons of ordinary skill in the art will readily appreciate that many other methods may alternatively be used. For example, the order of execution of the blocks may be changed, and/or the blocks may be changed, eliminated, or combined.

At block 874, an indication of a wormhole selection may be received. At block 878, the content to which the wormhole corresponds may be determined. Additionally, the device that is rendering, or should render, the corresponding content may be determined. For example, the wormhole manager 812 may determine, via the wormhole itself or via the wormhole database 808, the missing content to which the wormhole corresponds and the secondary device 44 on which the missing content is to be rendered, or should be rendered.

At block 882, the secondary device that is rendering, or should be rendering, the corresponding content, may be instructed to indicate the content to which the wormhole corresponds. For example, if the content is being rendered, the secondary device 44 may be instructed to cause the content to blink, may generate an outline around the content, may cause a caption to appear below or over the content, may cause the caption to blink, etc. If the content is not yet rendered on the rendering device, the wormhole manager 812 may cause the content to be sent to an appropriate secondary device 44 and rendered.

Other examples of a multi-device proxy server 28 that may be used are provided in U.S. patent application Ser. No. 10/334,291, entitled "System and Method For Rendering Content on Multiple Devices."

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A method for delivering requested media content, comprising:
    receiving a requested media object requested by a user device, the requested media object including media of at least a first type;
    creating a first new media object, the first new media object having at least some of the media of the requested media object of the first type;
    creating a second new media object, the second new media object having at least some of the media of the requested media object of a second type, if any, where the media of the second type is different than the media of the first type;
    inserting at least one user interface mechanism for activation by a user into the second new media object, the at least one user interface mechanism corresponding to media of the requested media object of the first type included in the first new media object;
    delivering the second new media object to the user device;
    delivering the first new media object to a secondary device separate from the user device; and
    causing a first new media object indicator to be generated in response to activation of the at least one user interface mechanism via the user device, the first new media object indicator indicating to the user media of the first new media object rendered on the secondary device.

2. A method as defined in claim 1, further comprising receiving an indication that the at least one user interface mechanism was activated via the user device.

3. A method as defined in claim 1, further comprising:
    determining capabilities of the user device for presenting types of media; and
    determining the first type of media included in the first new media object based on the determined capabilities of the user device.

4. A method as defined in claim 1, wherein the first type of media includes graphics.

5. A method as defined in claim 1, wherein the second type of media includes text.

6. A method as defined in claim 1, wherein the first type of media includes audio.

7. A method as defined in claim 1, wherein the first type of media includes video.

8. A method as defined in claim 1, wherein the requested media object comprises a first web page;
    wherein the second new media object comprises a second web page;
    wherein the first new media object comprises a third web page.

9. A method as defined in claim 8, wherein the first web page includes text and graphics;
    wherein the second web page includes at least some of the text of the text of the first web page;
    wherein the third web page includes at least some of the graphics of the first web page.

10. A method as defined in claim 9, wherein the secondary device comprises a secondary display;
    wherein graphics of the first web page includes a graphics object;
    wherein inserting the at least one user interface mechanism into the second new media object comprises inserting a graphical user interface mechanism in the second web page, the graphical user interface mechanism corresponding to the graphics object of the first web page;
    wherein creating the first new media object comprises including the graphics object of the first web page in the third web page;
    wherein delivering the first new media object to the secondary device comprises delivering the third web page for display via the secondary display in response to selection of the first graphical user interface mechanism via the user device.

11. A method as defined in claim 9, wherein the secondary device comprises a secondary display;
    wherein graphics of the first web page includes a graphics object;
    wherein inserting the at least one user interface mechanism into the second new media object comprises including a graphical user interface mechanism in the second web page, the graphical user interface mechanism corresponding to the graphics object of the first web page;
    wherein creating the first new media object comprises including the graphics object of the first web page in the third web page;
    wherein causing the first new media object indicator to be generated in response to activation of the at least one user interface mechanism via the user device comprises causing the graphics object to be indicated on the secondary display in response to selection of the first graphical user interface mechanism via the user device.

12. A method as defined in claim 1, wherein the first new media object indicator includes a visual indicator.

13. A method as defined in claim 1, wherein the first new media object indicator includes an auditory indicator.

14. A method as defined in claim 1, wherein the first new media object indicator includes a tactile indicator.

15. A tangible medium storing machine readable instructions comprising:
    a first set of prestored instructions to receive a requested media object requested by a user device, the requested media object including media of at least a first type;
    a second set of prestored instructions to create a first new media object, the first new media object having at least some of the media of the requested media object of the first type;
    a third set of prestored instructions to create a second new media object, the second new media object having at least some of the media of the requested media object of a second type, if any, where the media of the second type is different than the media of the first type;
    a fourth set of prestored instructions to insert at least one user interface mechanism for activation by a user into the second new media object, the at least one user interface mechanism corresponding to media of the requested media object of the first type included in the first new media object;

a fifth set of prestored instructions to deliver the second new media object to the user device;

a sixth set of prestored instructions to deliver the first new media object to a secondary device separate from the user device; and a seventh set of prestored instructions to cause a first new media object indicator to be generated in response to activation of the at least one user interface mechanism via the user device, the first new media object indicator indicating to the user media of the first new media object rendered on the secondary device.

16. A method for delivering media content to a plurality of devices, comprising:

receiving a first web page requested by a user device, the first web page including text and a first graphics object;

creating a second web page having at least some of the text of the first web page;

creating a third web page having the first graphics object of the first web page;

including a first graphical user interface mechanism for selection by a user in the second web page, the first graphical user interface mechanism corresponding to the first graphics object;

delivering the second web page to the user device; and delivering the third web page to a secondary display device separate from the user device;

causing an indicator of the first graphics object to be generated on the secondary display device in response to selection of the first graphical user interface mechanism via the user device.

17. A method as defined in claim 16, wherein the first web page includes audio data, the method further comprising:

creating an audio file having at least some of the audio data of the first web page;

delivering the audio data to an audio device, the audio device separate from the user device.

18. A method as defined in claim 16, wherein the first web page includes video data, the method further comprising:

creating a video file having at least some of the video data of the first web page;

delivering the video data to a tertiary display device, the tertiary display device separate from the user device.

19. A method as defined in claim 16, wherein delivering the third web page to the secondary display comprises delivering the third web page to the secondary in response to selection of the first graphical user interface mechanism via the user device.

20. A method as defined in claim 16, wherein the first graphical user interface mechanism includes an icon.

21. A method as defined in claim 16, wherein the first graphical user interface mechanism includes a button.

22. A method as defined in claim 16, wherein the first graphical user interface mechanism includes a link.

23. A method as defined in claim 16, wherein graphics of the first web page includes a second graphics object; the method further comprising:

including a second graphical user interface mechanism in the second web page, the second graphical user interface mechanism corresponding to the second graphics object;

wherein creating the third web page comprises including the second graphics object in the third web page;

wherein delivering the third web page to the secondary display device comprises delivering the third web page to the secondary display in response to selection of the second graphical user interface mechanism via the user device.

24. A method as defined in claim 16, wherein graphics of the first web page includes a second graphics object, the method further comprising:

including a second graphical user interface mechanism in the second web page, the second graphical user interface mechanism corresponding to the second graphics object;

creating a fourth web page including the second graphics object; and delivering the fourth web page to the secondary display in response to selection of the second graphical user interface mechanism via the user device.

25. A method as defined in claim 16, wherein causing an indicator of the first graphics object to be generated on the secondary display device comprises causing the first graphics object to flash on the secondary display.

26. A method as defined in claim 16, wherein causing an indicator of the first graphics object to be generated on the secondary display device comprises causing text proximate to the first graphics object to flash on the secondary display.

27. A method as defined in claim 16, wherein causing an indicator of the first graphics object to be generated on the secondary display device comprises causing an animation to be rendered proximate to the first graphics object on the secondary display.

28. A tangible medium storing machine readable instructions comprising:

a first set of prestored instructions to receive a first web page requested by a user device, the first web page including text and a first graphics object;

a second set of prestored instructions to create a second web page having at least some of the text of the first web page;

a third set of prestored instructions to create a third web page having the first graphics object of the first web page;

a fourth set of prestored instructions to include a first graphical user interface mechanism for selection by a user in the second web page, the first graphical user interface mechanism corresponding to the first graphics object;

a fifth set of prestored instructions to deliver the second web page to the user device; and a sixth set of prestored instructions to deliver the third web page to a secondary display device separate from the user device;

a seventh set of prestored instructions to cause an indicator of the first graphics object to be generated on the secondary display device in response to selection of the first graphical user interface mechanism via the user device.

29. An apparatus for delivering requested media content, the apparatus comprising:

a computer operatively coupled to a first network, to a user device, and to a secondary device separate from the first device, wherein the user device is capable of handling media content of a first type, wherein the secondary device is capable of rendering media content of a second type, the computer comprising:

a memory;

a processor coupled to the memory, the processor configured to detect reception of a requested media object via the first network, the requested media object being requested by the user device, the requested media object including media content of at least the second type, create a first new media object, the first new media object having at least some of the media of the requested media object of the first type, create a second new media object, the second new media object having at least some of the media of the requested media object of a second type, if any, where the media of the second type is different than the media of the first type, insert at least one user interface mechanism for activation by a user into the second new media object, the at least one user interface mechanism corresponding to media of the requested media object of the first type included in the first new media object, deliver the second new media object to the user device, deliver the first new media object to the secondary device, detect an activation of the at least one user interface mechanism, and cause the secondary device to indicate the media of the first new media object corresponding to the at least one user interface mechanism in response to the detection of the activation of the at least one user interface mechanism.

30. An apparatus as defined in claim 29, wherein the processor is configured to determine capabilities of the user device for handling types of media content;

wherein the processor configured to create the second new media object when the processor determines that the user device is not capable of handling the second type of media content.

* * * * *